United States Patent

[11] 3,624,557

[72] Inventors Bernard C. De Loach, Jr.
Murray Hill;
Donald L. Scharfetter, Morristown, both of N.J.
[21] Appl. No. 854,678
[22] Filed Sept. 2, 1969
[45] Patented Nov. 30, 1971
[73] Assignee Bell Telephone Laboratories, Inc.
Murray Hill, N.J.

[54] METHOD FOR MAKING DIODES FOR USE IN TRAPATT OSCILLATORS
5 Claims, 13 Drawing Figs.

[52] U.S. Cl. .......... 331/107 R, 317/235 K, 317/235 T
[51] Int. Cl. .......... H03b 7/06
[50] Field of Search .......... 331/107; 317/234

[56] References Cited
OTHER REFERENCES

B. G. Streetman et al., Applied Physics Letters, Vol. 14, No. 2, Jan. 15, 1969, pp. 63- 65
Johnston et al., Proc. IEEE, Vol. 56, Sept. 1968 pp. 1,611- 1,613 331- 107

*Primary Examiner*—John Kominski
*Attorneys*—R. J. Guenther and Arthur J. Torsiglieri

ABSTRACT: A diode for use in a TRAPATT oscillator circuit is made in a known manner with care being taken to minimize internal defects. Recombination centers are then introduced into the diode for reducing the diode lifetime to a sufficient value to give a reverse saturation current $I_s$ appropriate for TRAPATT mode operation. The recombination centers may be introduced by high energy particle radiation, gold doping or quenching.

INVENTORS: B.C. DE LOACH, JR.
D. L. SCHARFETTER
BY
ATTORNEY

PATENTED NOV 30 1971

3,624,557

METHOD FOR MAKING DIODES FOR USE IN TRAPATT OSCILLATORS

BACKGROUND OF THE INVENTION

This invention relates to avalanche diode oscillators and, more particularly, to TRAPATT diode oscillators.

The patent of Read U.S. Pat. No. 2,899,652 describes how a multilayer avalanche diode can be made to present a negative resistance and, when placed in a proper resonant circuit, generate microwave oscillations. An applied direct-current voltage biases a PN junction to avalanche breakdown, thereby creating current pulses each of which travels across a transit region within a prescribed time period. This transit time is arranged with respect to the resonant frequency of the external resonator such that radiofrequency voltages at the diode terminals are out of phase with the current pulses in the diode. With an appropriately designed phase shift, the current through the terminals increases as the voltage across the terminals decreases, thus establishing a negative resistance. Ultimately, part of the direct-current energy applied to the diode is converted to radiofrequency energy in the resonator and the circuit constitutes a solid-state microwave source.

Improved microwave oscillator avalanche diodes, now normally known as IMPATT diodes, are described in the paper "The IMPATT Diode—A Solid State Microwave Generator," *Bell Telephone Laboratories Record*, by K. D. Smith, Vol. 45, May 1967, p. 144; the paper "Microwave Si Avalanche Diode with Nearly Abrupt Type Junction," *IEEE Transactions on Electron Devices*, Vol. ED–14, Sept. 1967, p. 580, and the patent of B. C. De Loach Jr. et al. U.S. Pat. No. 3,270,293. Whereas the Read diode is a 4-layer device, the IMPATT diode is typically a P+ $\nu$ N+ or N+$\pi$ P+ diode with only three layers. The IMPATT diode is usually capable of higher efficiencies than the Read diode.

The paper of Prager et al. "High-Power High-Efficiency Silicon Avalanche Diodes at Ultra High Frequencies," *Proceedings of the IEEE*, Vol. 55, Apr. 1967, pp. 586–587, describes an IMPATT diode used in an oscillator circuit that gives higher efficiency than would be normally predicted from IMPATT diode theory. The Prager et al. oscillator circuit has been the subject of considerable study, and an analysis of it is described in the paper by Johnston et al., "High Efficiency Oscillations in Ge Avalanche Diodes Below the Transit Time Frequency," *Proceedings of the IEEE*, Vol. 56, Sept. 1968, pp. 1,611–1,613. This high-efficiency oscillator is now know to require a circuit having a high Q cavity resonance at the normal IMPATT frequency $f_i$, and also a resonance at an output frequency $f_i/n$, where $n$ is an integral number. The mode of oscillator operation is known as the TRAPATT mode, an acronym for *tr*apped *p*lasma *a*valanche *t*riggered *t*ransit.

While the TRAPATT diode oscillator has been the subject of extensive research for nearly 2 years, efforts at making such oscillators with reasonable reproducibility have been largely unsuccessful. It has been observed that many of the diodes burn out before going into TRAPATT oscillation, while others will operate in the TRAPATT mode only at temperatures near the burnout point.

SUMMARY OF THE INVENTION

We have found that a relatively high reverse saturation current $I_s$ is required for TRAPATT mode operation. Normally, in a well-made junction diode, the reverse saturation current, i.e., the maximum current flowing across the reverse biased PN junction prior to avalanche breakdown, is very low. $I_s$ will be reasonably high only if the diode contains a fairly large number of recombination centers, and thus, a relatively low carrier lifetime. Consequently, the only diodes that operate well in the TRAPATT mode are those with a sufficient number of crystalline defects to give a sufficiently high recombination center density to provide the necessary reverse saturation current $I_s$.

Having reached this understanding, we have determined that TRAPATT mode diodes can be reproducibly made by purposely introducing recombination centers as one of the fabrication steps. The diode may initially be made in a known manner to satisfy known criteria of TRAPATT operation, neglecting the $I_s$ parameter; in other words, it is made to be of conventional high quality with a minimum number of crystalline defects and hence a minimum number of recombination centers. Recombination centers are then introduced by, for example, irradiating the diode with high-energy neutrons to artificially produce crystalline defects within the diode. Alternatively, recombination centers may be produced by diffusing gold or other known recombination center producing elements into the diode. As still another alternative, recombination centers may be introduced by quenching; i.e., cooling the diode at a relatively high rate after the conventional impurity diffusion process.

One advantage of the irradiation method is that this process can be performed in situ. That is, the diode may be inserted in a TRAPATT oscillator circuit and may be irradiated until such time as it satisfactorily operates in the TRAPATT mode.

These and other objects, features and advantages of the invention will be better understood from a consideration of the following description taken in conjunction with the drawing.

DRAWING DESCRIPTION

Figure 1:
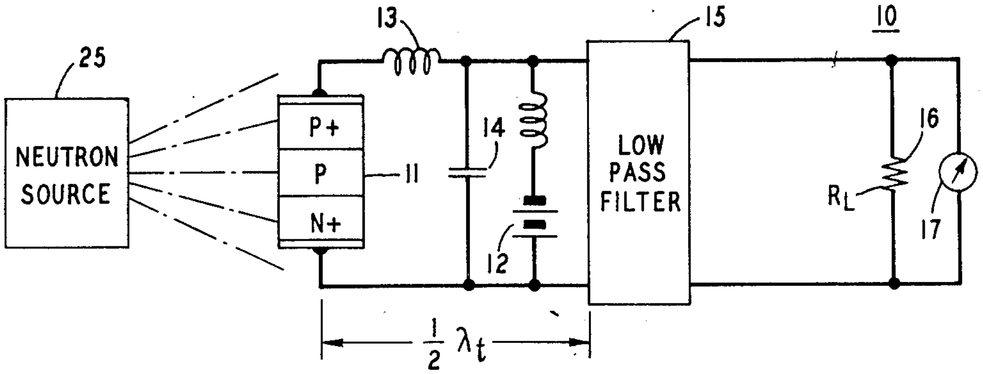
FIG. 1 is a schematic illustration of a circuit in accordance with one embodiment of the invention.
Figure 12:
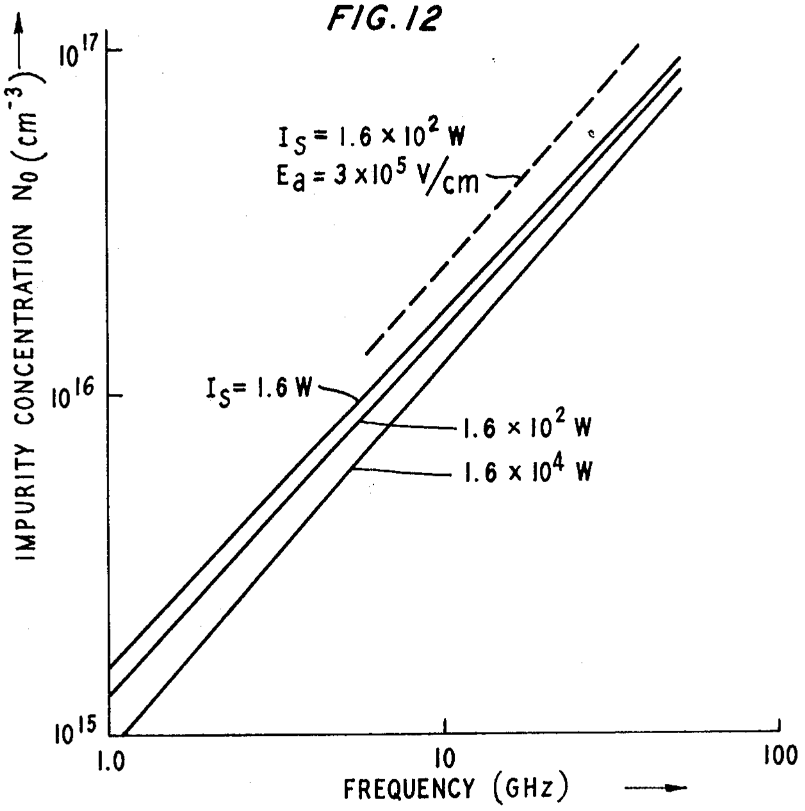
Figure 13:
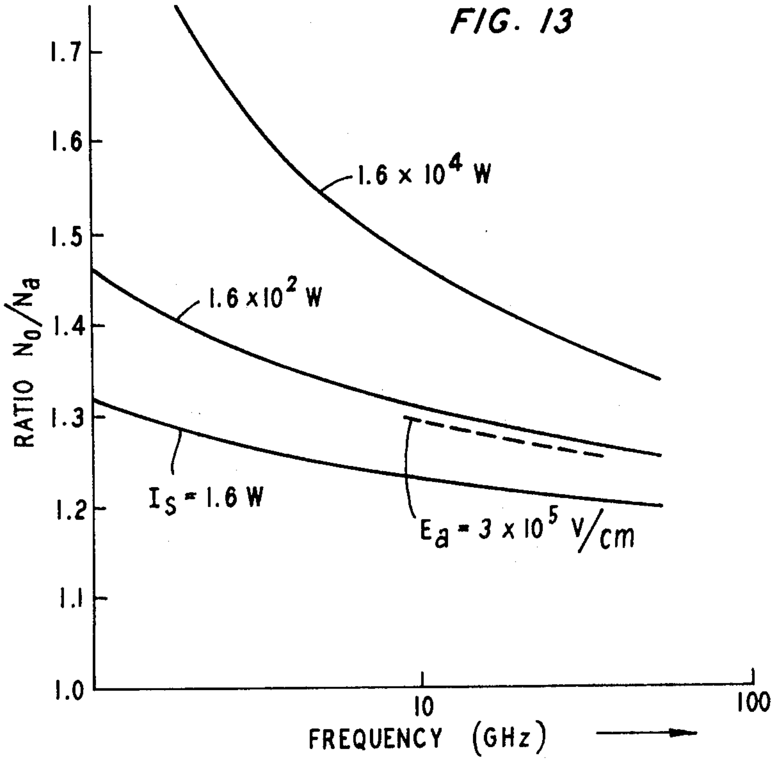

FIGS. 6, 7, 8, 9, 10, and 11 are graphs of electric field versus distance at different times in the diode of FIG. 1;

FIG. 12 is a graph of impurity concentration parameter $N_o$ versus frequency in the diode of FIG. 1;

FIG. 13 is a graph of the ratio of impurity concentration parameters $N_o/N_n$ versus frequency in the diode of FIG. 1.

DETAILED DESCRIPTION

Referring now to FIG. 1 there is shown a schematic illustration of a TRAPATT oscillator circuit comprising an avalanche diode 11 biased by a voltage source 12. An inductance 13 and a capacitance 14 constitute a tank circuit resonant at a frequency $f_i$. A low pass filter 15 passes energy at the operating TRAPATT frequency $f_t$, which equals $f_i/n$, where $n$ is an integral number. Filter 15 is located at a distance $\lambda_t/2$ from the diode, and the length of transmission line between the diode and the filter 15 constitutes the TRAPATT mode resonator. $\lambda t$ is, of course, the wavelength of energy at frequency $f_t$. The filter 15 passes the TRAPATT frequency $f_t$, but not the higher frequency $f_i$ and higher harmonics. The power output across a load resistor 16 is monitored by an indicator 17.

It can be shown that, in a self-starting TRAPATT oscillator circuit, the negative resistance avalanche diode initially operates as an IMPATT diode before going into the TRAPATT mode. That is, negative resistance oscillations result from an avalanche breakdown at the PN+ junction of the diode which creates a region of high current density that travels to the P+ layer during the finite transit time. This transit time is arranged with respect to the voltage appearing at the diode terminals such that current and voltage are out of phase. At a specific frequency known as the diode IMPATT frequency $f_i$, terminal voltage and current have substantially a 180° phase relationship, and IMPATT mode efficiency is at a maximum.

With a properly designed diode 11, the circuit 10 soon begins oscillating in a TRAPATT mode characterized by a high-efficiency output at $f_t$, which is typically one-half or one-third the IMPATT frequency $f_i$.

Unlike the IMPATT mode, TRAPATT oscillation is characterized by a traveling avalanche zone that propagates through the P-type layer. A somewhat idealized illustration of the phenomenon is given by the graph of FIG. 2 in which curves 19 through 22 represent the diode electric field distribution at times $t_1$ through $t_4$, respectively. The aforementioned Johnston et al. reference gives a more precise time sequence of events.

The TRAPATT mode commences when the electric field E is driven well in excess of the breakdown field value $E_c$. An avalanche zone is then created which is driven through the diode as long as the external circuit can supply the necessary current. The large numbers of carriers created at the peak values of electric field result in a space-charge neutral plasma of holes and electrons in the wake of the zone, or in other words, to the left of each of the curves 20–22. This large "trapped" plasma reduces the electric field value to the left of each curve essentially to zero, thus reducing the diode voltage to near zero and allowing a high-current, low-voltage state. The extraction of this charge now proceeds and the diode recovers to a high-voltage, low-current "swept" state. The alternation of these two states yields exceptionally high efficiencies. While the best of conventional IMPATT diode oscillator circuits yield efficiencies on the order of 20 percent, circuits such as that of FIG. 1 have yielded efficiencies in excess of 60 percent.

Although high-efficiency TRAPATT oscillators have been built and reported in the literature, efforts at making such oscillators with reasonable reproducibility have been largely unsuccessful. We have therefore attempted to characterize as accurately as possible the conditions and diode parameters for establishment of the TRAPATT mode. We have found, for example, that the resonator defined by reactances 13 and 14 must have a high Q at a frequency which is an integral multiple of the output frequency to be derived. The width of the P− region of the diode must be sufficiently small that at the breakdown voltage $E_c$, the high field region extends to the P+ region. This condition is illustrated by curve 23 of FIG. 2.

The condition to which the present invention is directed is the discovery that the reverse bias saturation current $I_s$ must be of an appropriate value to permit TRAPATT operation. Normally, if junction diodes are "well made" the reverse saturation current is quite small. However, in TRAPATT oscillation, if $I_s$ is too small, the plasma density cannot build up to a sufficient value to give the electric field characteristics shown in FIG. 2. Hence, an increasing reverse bias voltage simply burns the diode out and the TRAPATT mode is never achieved. In other cases, the diodes go into TRAPATT mode operation only after their physical temperature has been raised to a sufficient value to appropriately increase $I_s$.

$I_s$ increases in proportion to the number of diode recombination centers, which may result from disturbances or defects in the crystal structure of the diode. Thus, we now appreciate that one reason many TRAPATT oscillator circuits have failed to operate properly is because the diodes were too "well made"; that is, they did not have enough interior defects to give an appropriately high $I_s$.

In accordance with our invention, diode 11 is made in accordance with accepted techniques such as to be "clean" and substantially free of defects. It is then mounted in the circuit as shown and irradiated by a neutron source 25 which creates atomic defects in the lattice structure to increase the reverse saturation current $I_s$. The circuit is then operated to determine whether it is capable of TRAPATT operation at a relatively low temperature, and if not, the radiation process is repeated until satisfactory operation is attained.

Figure 2:
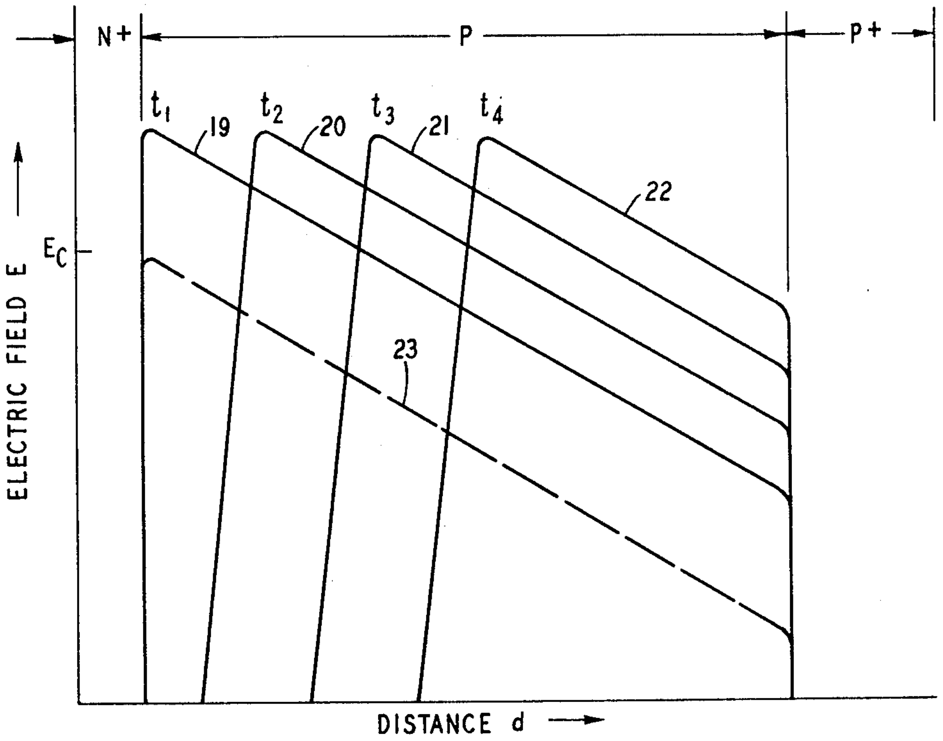
FIG. 2 is a graph of electric field versus distance in the diode of the circuit of FIG. 1.

It can be shown that the optimum reverse saturation current density $I_s$ is attained when the following equations are satisfied:

$$I_s=\frac{qn_iW}{\tau} \qquad (1)$$

$$\frac{v_p}{v_z}=\frac{1}{a}\left(\sqrt{1+a^2}-1\right) \qquad (2)$$

$$a=\frac{2I_o(2N_o/N_a-1)}{j_o(4N_o/N_a-3)} \qquad (3)$$

$$\frac{I_s}{I_o}=\frac{j_o}{I_o}\exp\left(\frac{I_s-j_o}{I_o}\right) \qquad (4)$$

where $q$ is the charge on a majority carrier, $n_i$ is the intrinsic carrier concentration at the operating temperature, $W$ is the width of the P-type region, $\tau$ is the effective lifetime of the recombination centers in the depletion region, $v_p$ is the plasma velocity, $v_z$ is the velocity of propagation of the avalanche zone illustrated in FIG. 2, $N_o$ is the majority carrier concentration, $N_a$ is the impurity concentration, and $I_o$ is the current density at the diode terminals. For purposes of convenience and consistency with the appendix, $I_s$ in the above equations has the dimensions of current density.

The crystalline defects created by the neutron radiation constitute recombination centers that have the effect of reducing the majority carrier lifetime in the diode. As can be seen from equation (1), reverse saturation current $I_s$ is inversely proportional to lifetime $\tau$.

It has been found that integrated flux levels of between $10^{13}$ and $1.3\times10^{14}$ neutrons per square centimeter with energies of 0.1 mev or greater will significantly reduce the lifetime within silicon diodes. Other methods of controllably reducing diode lifetime include diffusing gold into the diode after the general manner described in the patent of Ciccolella et al. U.S. Pat. No. 3,067,485, issued Dec. 11, 1962. As still another alternative, recombination centers can controllably be introduced by quenching the diode, or in other words, cooling it at a faster rate than would normally be prudent. For example, after the last diffusing step in diode fabrication, the lifetime, can be reduced to 10 to 100 nanoseconds by cooling it from 1,100° to 500° C. in about 2 minutes.

An appendix has been included in this specification for the purpose of rigorously characterizing the TRAPATT mode of diode operation, giving the background for equations 1–4, and providing material from which other TRAPATT mode oscillators may be designed. While this theoretical analysis appears satisfactorily to explain observed experimental phenomena, it is not intended to limit or define the scope of the invention. It will, however, be clear to those skilled in the art, particularly from a study of the appendix, that numerous variations may be made to the TRAPATT circuit depicted in FIG. 1. Specifically, the diode 11 might well be a P+-N-N+ structure. Electron bombardment or other forms of radiation may alternatively be used for reducing diode lifetime. Various other embodiments and modifications may be made by those skilled in the art without departing from the spirit and scope of the invention.

APPENDIX

This discussion ignores the complicated device-circuit interaction by presupposing certain terminal voltage and current waveforms and the resulting simplification allows the calculation of the essentials of TRAPATT operation. This device design theory then serves as a starting point for a more complete theory including device circuit interactions. The simplifications employed were justified through the ability to "check" against precise solutions of the differential equations obtained by numerical techniques.

TRAPATT operation can be separated into three distinct periods: (1) A transient charging period resulting in a high-current, low-voltage state, followed by (2) a transient charge removal period resulting in a high-voltage, low-current state, and (3) a continuation of the high-voltage, low-current state, in which to date IMPATT voltages build up to again initiate period 1. It is perhaps of some help to visualize period 1 as the closing of a switch and period 2 as the opening of a switch.

The actual device-circuit interactions required to produce these states in a repetitive cycle are complicated. But as will be seen, the essential device characteristics can be derived by assuming that this cyclic behavior does occur and then determining the necessary device properties.

A considerable effort will first be made to make plausible the propagation of an avalanche "zone" through the entire depletion region of a reverse biased PN junction under the appropriate boundary conditions.

I. THE TRANSIENT CHARGING PERIOD

Figure 3:
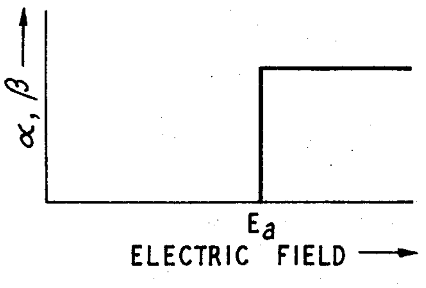
FIG. 3 is a graph of ionization coefficients versus electric field in the diode of FIG. 1.
Figure 4:
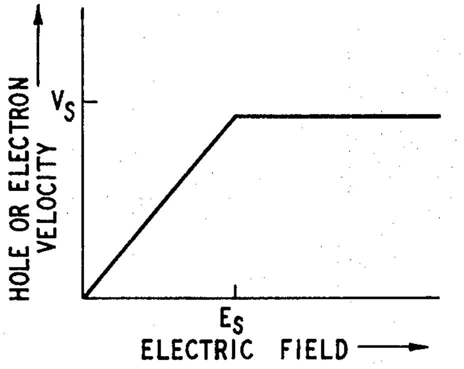
FIG. 4 is a graph of carrier velocity versus electric field in the diode of FIG. 1.

In order to achieve the highest level of understanding, the simplest of approximations will be employed. The degree to which these approximations affect the results is discussed later in the text. The ionization coefficients $\alpha$and $\beta$for electrons and holes are assumed equal, and 0 for values below a critical field $E_a$ and constant above $E_a$ (see FIG. 3). Both carrier velocities are assumed to be characterized by the same linear mobility up to a saturation field $E_s$ above which their velocities are equal, constant, and labeled $v_s$ (see FIG. 4). The simplest structure for illustrative purposes is that of FIG. 5, i.e., a step junction that "reaches through" to the substrate at breakdown.

Assume an initial state such that the peak field is below $E_a$ and an exceedingly small but finite $I_{sat}$ is flowing. (Carriers are needed to start the multiplication process.) Now apply a step in current to the diode terminals. The expected events can be illuminated by first considering a well-understood system, i.e., a normal parallel plate capacitor with air dielectric and fixed plate separation. A step of current applied to such a capacitor causes displacement current to flow therein and since this current can be expressed as $\epsilon(\partial E/\partial t)$, (Maxwell's equations) the electric field $E$ between the capacitor plates increases at a constant rate as long as the constant current is maintained. Obviously, the air dielectric would break down if this field change continues long enough. Similar events occur in our semiconductor capacitor except that the breakdown occurs preferentially at one edge due to a built-in slope in electric field arising from the net space charge of the ionized impurities. In our model the applied terminal current per unit area $I_o$ drives the field up uniformly throughout the diode until $E$ reach $E_a$. Thus, as long as the peak is less than $E_a$, successive time snapshots of equal duration would show electric field vs. distance plots, for the structure of FIG. 5, as shown in FIG. 6. Obviously, something different happens, however, when the peak field reaches $E_a$ and charge multiplication begins.

It is at this point that our assumption as to the magnitude of $I_o$ is crucially important. For relatively low values of $I_o$ nothing dramatic happens. (This situation has been analyzed in considerable detail and can give rise to space-charge feedback negative resistances which have to date proved operationally uninteresting.) However, something dramatic does happen if $I_o$ is of such magnitude that the resulting $(\partial E/\partial t)$ in the depletion region drives the point at which $E$ reaches $E_a$ through the diode at a velocity greater than the maximum velocity at which carriers can travel in the semiconductor. It has been shown that under these conditions an avalanching "-zone" can propagate through the diode, filling the original depletion region with a dense hole electron plasma and reducing the voltage across the diode to essentially 0.

The current to the right of the position where $E$ reaches $E_a$ is displacement current, plus an extremely small conduction current per unit area, $I_s$. The velocity at which this "edge" of the avalanching region propagates through the diode is then easily obtainable. For $E$ less than $E_a$ the slope of the electric field with distance is determined from Poisson's law as $$\frac{dE}{dx}+-\frac{qN_a}{\epsilon} \qquad (5)$$

where $-qN_a$ represents the negative charge density of the fixed acceptors and where we have neglected the mobile charge densities of holes and electrons of $I_s$ in comparison with $N_a$. Letting time begin when the peak field at the left of the diode just reaches $E_a$, and taking $x=o$ at the left of the original depletion region we can write from (5) that at $t=o$, $$E(x)=E_a-\frac{qN_a}{\epsilon}x \qquad (6)$$

Due to our assumptions, to the right of the point at which $E(x)$ reaches $E_a$, $$E(x,t)=E(x,o)+\frac{I_o t}{\epsilon} \qquad (7)$$

where the latter term is obtained from an integration of $$I_o=\epsilon(dE/dt) \qquad (8)$$

assuming $I_o$ a constant. Consequently, from equation (7), the field maintains its original slope and increases at the same rate for all $x$ (see FIG. 6). Combining equations (6) and (7) we obtain the field to the right of the point at which $E$ reaches $E_a$ as $$E(x,t)=E_a-\frac{qN_a}{\epsilon}x+\frac{I_o t}{\epsilon} \qquad (9)$$

Thus, the value of $t$ at which the electric field reaches $E_a$ at a given distance $x$ into the depletion region is obtained by setting $E(x,t)$ equal to $E_a$ in equation (9), yielding $$\frac{qN_a}{\epsilon}x=I_o t \qquad (10)$$

Or upon differentiating $$\frac{dx}{dt}\equiv v_z=\frac{I_o}{qN_a} \qquad (11)$$

where $v_z$ will be labeled the "avalanche zone velocity" and represents the velocity at which the leading edge of the avalanching region progresses through the diode. theory It is important to realize that $v_z$ must be greater than $v_s$ in order for our theory to apply and consequently $$I_o>v_s qN_a \qquad (12)$$

Equation (12) presents the first design information for TRAPATT operation. It specifies the driving current per unit area required to cause the entire depletion region to "breakdown" in terms of the impurity density in the depletion region.

Although equation (12) was derived on the basis of a constant current, it can be shown that avalanche will spread throughout the entire depletion region as long as the driving current always exceeds the value represented by $I_o$, whatever its time dependence, i.e., it might at times be $2I_o$, $3I_o$, etc.

So far, it has been shown that an applied constant current of sufficient magnitude will cause avalanche to spread throughout an ordinary step junction which is usually thought of as avalanching only at the end at which the electric field is the highest just prior to breakdown. Still more exotic events occur, under appropriate conditions, when the extent (in space) of the avalanching region is considered.

Since the electric field in the heavily doped end region at the left is very low, i.e., just large enough to carry the total current $I_o\equiv\mu$ Eqn with $n\approx N^+_d$, it is obvious that the electric field must again drop below $E_a$ to the left of the leading edge of our avalanche zone. Thus an avalanching zone of finite extent exists and a snapshot in time must display an electric field vs. distance having the general characteristics displayed in FIG. 7. Regions AB and GH merely display the very low field and regions where nothing interesting is happening. Plane B represents the right boundary of the original depletion region and in region BC we have the remaining "depleted region" at this point in time. Hence, to the right of plane C, which represents the onset of avalanche, the current is essentially all displacement current and the electric field has a slope given by equation (5) and a magnitude given by equation (9) where $x$ is measured from G, the left-hand boundary of the original depletion region. Region CD contains all of the diode that is avalanching, i.e., $E=E_a$ at plane C and at plane D. Region DE is that region to the left of the avalanche zone in which $E$ remains above $E_s$, the value of electric field required to keep carrier velocities saturated, and region EF contains the section of the diode in which $E$ readjusts from $E_s$ to the value of $E$ required to carry the current $I_0$ in the "plasma" now in the remainder of the depletion region, i.e., region EG. $E$ drops to a still lower value in region GH, the heavily doped material at the left of the diode.

Having described completely the phenomena in region BC through equations (5) through (11), now consider avalanche region CD. It is to be noted that the occurrence of events at a given value of electric field within the avalanche zone are only influenced by events to the right of the zone as long as $I_0$ is flowing, since carriers cannot keep up with the zone, equation (12). At the leading edge of the avalanche region the particle current $I_s$ is always present as the zone travels through the depletion region. $I_s$ is assumed independent of distance. Also the slope of the electric field at the leading edge of the zone is always the same and is determined by Poisson's equation from the impurity density. Consequently, an observer situated at the leading edge of the avalanche zone, and moving with the same velocity, must see a time invariant $E$ vs. distance throughout the avalanche zone. (This statement must be modified if the avalanche zone extends to the edge of the original depletion region as would be the case for startup.) This follows from our assumption that we have a generator of appropriate design to maintain $I_0$ through the diode with $I_0 > v_s q N_a$, and a constant $I_s$ initiating the avalanche.

Consider now a moving reference frame attached to plane C and consequently moving with velocity $v_z$ in our original inertial system. To an observer in the moving reference frame electrons appear to move to the left with a velocity $v_s+v_z$ and holes appear to move to the left but with a smaller velocity $(v_z-v_s)$. Thus by the usual conventions, hole and electron currents now appear to flow in opposite directions. Also, the moving observer sees a "particle current" due to the ionized impurities passing by.

The hole and electron charge continuity equations in the moving frame can consequently be written as $$q(v_s+v_z)dn/dz=q\alpha(n+p)v_s \qquad (13)$$

$$q(v_z-v_s)dp/dz q\alpha(n+p)v_s \qquad (14)$$

where positive $z$ is measured to the left from plane C and wherein we have utilized the fact that $\frac{\partial}{\partial t}\,p(z,t)=\frac{\partial}{\partial t}\,n(z,t)=0$, i.e., in the moving reference frame, quantities are time invariant. Subtracting equation (13) from (14) and integrating over $z$, yields $$(n-n_s)=(p-p_s)\,\frac{v_z-v_s}{v_z+v_s} \qquad (15)$$

where $n_s$ and $p_s$ are the electron and hole densities at the leading edge of the avalanche region, i.e., those of $I_{sat}$ where $I_{sat}=qn_sv_s+qp_sv_s$ in the inertial frame. Equation (15) relates the density of avalanche created electrons to avalanche created holes at any given $z$. It can be made plausible from the following. Imagine an observer at some position z. To his right hole electron pairs are being produced in identical numbers and both electrons and holes move past him at the same rate, i.e., in numbers per second. The electrons, however, are traveling at a higher rate of speed $(v_z+v_s)$ than the holes $(v_z-v_s)$ and hence the electrons are on the average spaced farther apart in distance, or their density is less. The ratio of the densities is obviously equal to the inverse of the ratio of the velocities which is precisely what equation (15) states. It should be noted that within a very short distance into the avalanche zone equation (15) simplifies to $$n=p\,\frac{v_z-v_s}{v_z+v_s} \qquad (16)$$

for reasonable values of $\alpha$.

Utilizing equation (15) to eliminate $n$ from equation (14) yields after an integration over $z$, $$p=\frac{v_z+v_s}{2v_z}\left[p_s\left(\frac{v_z-v_s}{v_z+v_s}\right)-n_s+(n_s+p_s)e^{Dz}\right] \qquad (17)$$

and similarly $$n=\frac{v_z-v_s}{2v_z}\left[n_s\left(\frac{v_z+v_s}{v_z-v_s}\right)-p_s+(n_s+p_s)e^{Dz}\right] \qquad (18)$$

where $$D=\frac{2\alpha v_z v_s}{(v_z+v_s)(v_z-v_s)}$$

These equations give $p(z)$ and $n(z)$ within the avalanche region. Again, within a very short distance these simplify to, $$p=\frac{v_z+v_s}{2v_z}\cdot(n_s+p_s)e^{Dz} \qquad (19)$$

$$n=\frac{v_z-v_s}{2v_z}\cdot(n_s+p_s)e^{Dz} \qquad (20)$$

In order to obtain equations (17), (18), (19), and (20), $\alpha$ has been assumed constant. $\alpha(E)$ may be included by replacing exponent $Dz$ by $\frac{2v_zv_s}{(v_z+v_s)(v_z-v_s)}\int_0^z \alpha(E)dz$ As will be seen, this will have surprisingly little effect on our general conclusions.

For a complete delineation of the characteristics of the avalanche region, the extent of the zone and $E(z)$ within the zone must be obtained. First we obtain $E(z)$ through the utilization of Poisson's equation which can be written $$-(dE/dz)=q/\epsilon(p\text{-}n\text{-}N_a) \qquad (21)$$

in the moving reference frame. Note the total derivative rather than a partial derivative since quantities are time invariant. The negative sign preceding $dE/dz$ is due to the fact that $z$ and $x$ are oppositely directed. Integrating over $z$ $$E(z)-E_0=-\frac{q}{\epsilon}\int_0^z(p-n-N_a)dz \qquad (22)$$

Utilizing equations (17) and (18) for $p(z)$ and $n(z)$ yields, $$E(z)-E_0=-\frac{q}{\epsilon}\frac{v_s}{v_z}\frac{n_s+p_s}{D}(e^{Dz}-1)\left[-\frac{v_z+v_s}{v_z}n_s+\frac{v_z-v_s}{v_z}p_s-N_a\right]z \qquad (23)$$

Since the first two terms in the last expression are usually (except for a PIN) much smaller than $N_a$, $$E(z)-E_0\approx\frac{q}{\epsilon}\frac{v_s}{v_z}\frac{n_s+p_s}{D}(1-e^{Dz})+\frac{q}{\epsilon}N_az \qquad (24)$$

Equation (24) then expresses $E$ as a function of $z$ within the avalanche region.

The extent of the avalanche region can be determined from equation (24). Note that $E(z)$ first rises to a maximum value $(E/\partial z=0)$ and then drops to $E_c$ at the left-hand edge of the avalanche region (plane $D$ in FIG. 7). Consequently, setting $E(z)=E_c$ in equation (24) yields $$v_s(n_s+p_5)e^{Dz*}=v_zDN_az* \qquad (25)$$

where we have neglected 1 compared to $e^{Dz}$ at the left edge of the avalanche region and where $Z*$ represents the width of the avalanche region. This transcendental equation can be solved explicitly for $z*$ for known values of the parameters. Note that equation (25) can be rewritten $$I_se^{Dz*}=I_0Dz* \qquad (26)$$

i.e., the extent of the avalanche region is a function of the reverse saturation current density $I_s$, the driving current density $I_0$, the impurity density $N_a$ and the ionization coefficient $\alpha$ which is contained in D. Again, if $\alpha$ is a function of electric field $(Dz*)$ in equation (26) becomes an integral which does not affect our qualitative interpretation of (26).

In addition to the above, the peak field attained in the avalanche region is of interest. Differentiating equation (24) with respect to $z$ and setting $dE/dz=0$ yields $$Dz^{+}=\ln\frac{N_av_z}{v_s(n_s+p_s)} \qquad (27)$$

where $z^{+}$ is the value of $z$ at which $E(z)$ reaches its peak value.

The value of $E(z)$ where $z=z^+$ is given by equation (24) as $$E(z^+)=E_o+\frac{q}{\epsilon}\frac{v_s}{v_s}\frac{n_s+p_s}{D}\left(1-\frac{N_a v_s}{v_s(n_s+p_s)}\right)+\frac{q}{\epsilon}\frac{N_a}{D}\ln\frac{N_a v_s}{v_s(n_s+p_s)} \quad (28)$$

Since $$\frac{N_a v_s}{v_s(n_s+p_s)}\gg 1$$

$$E(z^+)\approx E_a+\frac{q}{\epsilon}\frac{N_a}{D}\left(\ln\frac{I_0}{I_s}-1\right) \quad (29)$$

Thus, the amount the peak field rises above $E_c$ has a rather complicated dependence. For $v_z>>v_s$ such that $$D\approx\frac{v_z\alpha}{v_s}$$

equation (30) can be written $$E(z^+)-E_a=\frac{I_0}{\epsilon\alpha v_s}\left(\ln\frac{I_0}{I_s}-1\right) \quad (30)$$

Thus the peak field obviously increases as $I_o$ increases and decreases as $\alpha$ increases. Also it is affected logarithmically by the ratio of $I_0$ to $I_s$ with larger values of $I_s$ resulting in lower peak values of $E(z)$. This concludes our study of the avalanche zone. It should be remarked that the particle density, equations (17) and (18), the $z$ dependence of $E$, equation (24), the width, equation (26), and the peak electric field, equation (28), are all highly dependent on the form of $\alpha(e)$. Thus, these results are qualitative in nature.

Figure 7:
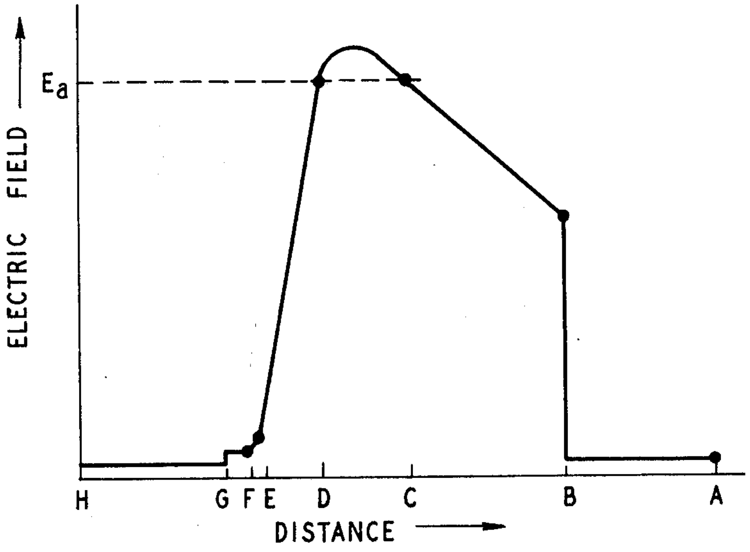

The next region to be analyzed is DE in FIG. 7, i.e., the region to the left of the avalanche zone in which carrier velocities remain saturated. Again, we can invoke time invariance in the frame moving with velocity $v_z$. This follows from the fact that this "region" is progressing through the diode in a manner entirely determined by the events to the right of it, i.e., no carriers can catch up to it from the left and hence it is driven at $v_z$ just as the avalanche zone is driven at velocity $v_z$. (This statement is strictly true only after plane $E$ is distinguishable from plane G.)

The hole and electron densities at plane $D$ can be obtained from equations (19) and (20) as $$p(z^*)=\frac{v_z+v_s}{2v_z}(n_s+p_s)e^{Dz^*}$$

$$n(z^*)=\frac{v_z-v_s}{2v_z}(n_s+p_s)^{Dz^*} \quad (31)$$

where $z^*$ is the width of the avalanche zone. These densities are maintained throughout region DE due to the fact that velocities remain constant in this region and no carriers are created therein. It is interesting that the sum of the hole and electron currents exceed $I_o$, the driving current in this region. This must be, since $(\partial E/\partial t)$ is negative, and, of course, current continuity must be maintained. An observer in the stationary reference frame would see a total particle current $j_c$ in region DE given by $$j_c=qv_s[p(z^*)+n(z^*)]=I_se^{Dz^*}. \quad (32)$$

This equation can be rewritten to avoid all the mechanics of the avalanche region (i.e., the dependence on $\alpha$ and $z^*$) through the employment of equation (26) to yield $$j_c=I_se^{\frac{j_c}{I_0}} \quad (33)$$

This equation is rather remarkable in that it gives the particle current density to the left of the avalanche zone in terms of $I_s$ and $I_o$ alone. Note that this is completely independent of the functional dependence of $\alpha$ on $E$.

The slope of the electric field is constant in region DE and is obtainable from equation (21) and equations (31) as $$\frac{dE}{dz}=\frac{q}{\epsilon}\left(\frac{v_s(n_s+p_s)e^{Dz^*}}{v_z}-N_a\right) \quad (34)$$

or $$\frac{dE}{dz}=\frac{qN_a}{\epsilon}\frac{j_c-I_0}{I_0}. \quad (35)$$

Thus, if equation (33) is employed to obtain $j_c$ as a function of $I_o$ and $I_s$, equation (35) yields $dE/dz$ in terms of $I_o$, $I_s$ and $N_a$. Consequently, the particle current and the slope of the electric field with distance are constant throughout region DE and their values depend only upon $I_o$, $I_s$, and $N_a$, and are independent of the functional form of $\alpha(E)$.

Next consider region EF. Plane $E$ moves to the right with velocity $V_z$ as previously noted. Within region EF carrier velocities are given by $\mu E$ with $E(z)$ determined from Poisson's equation, where $z$ is now measured from plane $E$. It is perhaps apparent that the electric field vs, distance profile, in region EF, as seen by an observer at plane $E$ moving with velocity $v_z$ is time independent. Again, this is due to the fact that events to the left of plane F do not affect region EF (as long as $I_o$ is maintained), i.e., hole velocity to the left of plane F is $\mu E_{min}$ where as in region EF it is $\geq\mu E_{min}$ by definition. Hence, no hole current flows into region EF from the left. Similarly, electron velocities are higher within region EF than those to the left of plane F.

Within region EF we must have continuous hole and electron currents in the moving frame, since $E$ is not a function of time within this frame, i.e., $$j_h=(v_z-\mu E)p=q(v_z-v_s)p(z^*)$$

$$j_e=q(v_z+\mu E)n=-q(v_z+v_s)n(z^*) \quad (36)$$

Consequently, $$p=\frac{v_z-v_s}{v_z-\mu E}p(z^*)=\frac{j_c}{2qv^*(v_z-\mu E)}$$

$$n=\frac{v_z+v_s}{v_z+\mu E}n(z^*)=\frac{j_c}{2qv^*(v_z+\mu E)} \quad (37)$$

where $v^*\equiv\frac{v_sv_z}{(v_z^2-v_s^2)}$.

The particular solutions of equations (37) at plane F, where $E$ reaches its lowest value, are important because these solutions give the hole and electron density left in the wake of the avalanche zone. Then, when $E=E_{min}$, and $dE/dz=0$, we must have $p=n-N_a=0$ or, from equations (37)

$$\frac{j_c}{2qv^*}\left[\frac{1}{v_z-\mu E_{min}}-\frac{1}{v_z+\mu E_{min}}\right]=N_a \quad (38)$$

This equation can be solved for $\mu E_{min}$ yielding $$\mu E_{min}=v_z\left(\frac{-j_c}{2I_0v^*}+\sqrt{\left(\frac{j_c}{2I_0v^*}\right)^2+1}\right) \quad (39)$$

and finally equations (37) and (39) give the hole and electron densities in the wake of the avalanche as $$p_0=\frac{j_c}{2qv^*v_z\left[1+\frac{j_c}{2I_0v^*}-\sqrt{\left(\frac{j_c}{2I_0v^*}\right)^2+1}\right]}$$

$$n_0=\frac{j_c}{2qv^*v_z\left[1-\frac{j_c}{2I_0v^*}+\sqrt{\left(\frac{j_c}{2I_0v^*}\right)^2+1}\right]} \quad (40)$$

It is to be noted that $p_o$ and $n_o$ are independent of the assumed dependence of $\alpha$ on electric field, as was $i_c$.

The significance of equations (39) and (40) can be better appreciated by considering the special cases where $\mu E_{min}<<v_s<<v_z$. Then, $$\mu E_{min}=\frac{I_0}{j_c}v_s$$

$$p_0=\frac{j_c\left(1+\frac{qN_av_s}{j_c}\right)}{2qv_s}$$

$$n_0=\frac{j_c\left(1-\frac{qN_av_s}{j_c}\right)}{2qv_s} \quad (41)$$

Thus, $p_o$ and $n_o$ become comparable $$\left(\text{since } \frac{qN_a v_s}{j_c} \ll 1\right)$$

and essentially proportional to $j_c$. Since $j_c$ is only a function of $I_o$ and $I_s$, $p_o$ and $n_o$ are uniquely determined by $I_o$, $I_s$, and $v_s$ and as in the more general case are independent of the details of the avalanche process.

An expression for $E(z)$ in region EF can be obtained from the employment of equations (37) to obtain $p(E)$ and $n(E)$ in Poisson's equation. A partial fraction integration then yields an involved algebraic expression for $E(z)$ which is of little interest and will not be included. The triviality of $E(z)$ in this region is due to the fact that the voltage contributed by $$\int_{E_{min}}^{E_s} E(z)dz$$

is a very small fraction of the total diode voltage. Region FG which eventually occupies the entire depletion region is thus filled with hole electron plasma densities given by equations (40). The electric field in this region is given by $E_{min}$, equation (39), except at the edges of the depletion region where zone formation and zone annihilation occur. Little attention has been paid to the transient in which the zone is actually first formed and nothing has been said about the "annihilation" transient when the leading edge of the zone arrives at the right-hand boundary (plane B, FIG. 7 of the original depletion layer). However, detailed computer studies indicate that the filling of the depletion region with a constant density hole electron plasma, i.e., ignoring the transients, is a reasonably good approximation.

It has been shown that the traveling avalanche zone first observed in very involved large signal computer solutions can be predicted from the simplest of models. Furthermore, the essential features of this phenomenon for TRAPATT operation, i.e., how fast the zone travels and how much plasma it leaves behind are independent of the detailed nature of the avalanche process as long as $\alpha$ is sufficiently large that the width of the avalanche zone is a reasonably small fraction of the original depletion layer width.

This completes our study of the traveling avalanche zone. Certainly more accurate modeling of $\alpha(E)$ can be done, but it should be remembered that precise solutions to the differential equations already exist and, as will be seen in the following section, the principal results obtained are actually the plasma densities left in the wake of the avalanche zone and these are independent of the dependence of $\alpha$ on electric field. Consequently, we now turn our attention to the recovery transient.

II. THE TRANSIENT RECOVERY CYCLE

An interesting sequence of events occurs in TRAPATT operation following the avalanche zone transit. Rather than attempt to include these events in time sequence from the start, a simpler problem will first be treated. As will be seen, this problem contains the essence of the TRAPATT recovery period and with relatively minor additions presents a reasonably accurate picture in comparison with "exact" numerical calculations.

Figure 5:
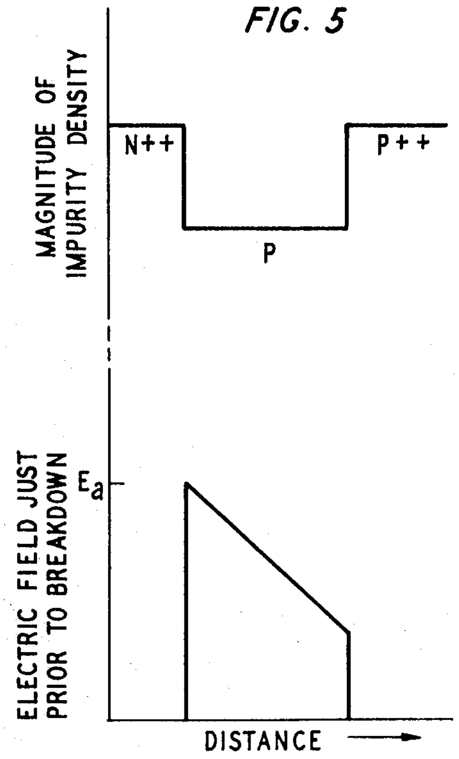
FIG. 5 illustrates graphs of impurity density and electric field versus distance in the diode of FIG. 1.
Figure 6:
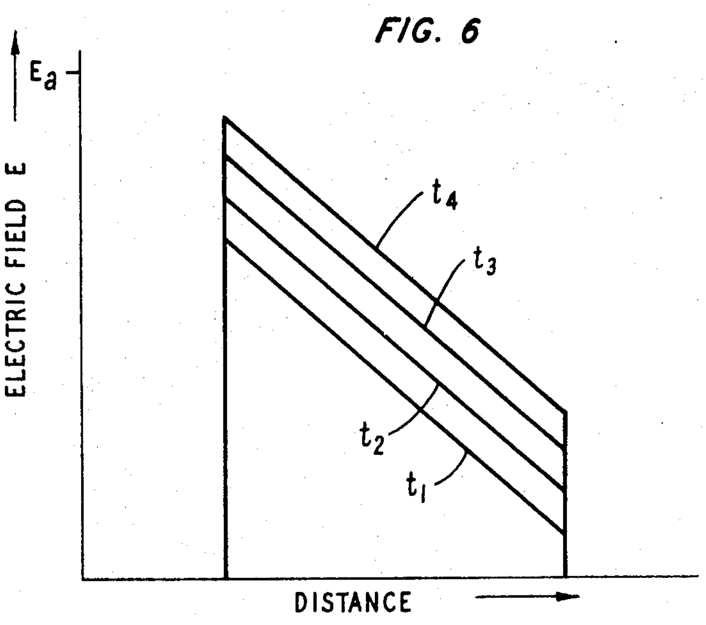

Assume the same punched-through step junction previously discussed, FIG. 5, but having the original depletion layer now filled with holes of uniform density $p_o$ and electrons $n_o$ and being space charge neutral, i.e., $p_o - n_o - N_a = 0$, and $n_o$ and $p_o$ constant throughout the original depletion layer. Further assume that at time zero a constant recovery current per unit area $I_R$ is applied to the diode terminals in the same direction as the current which initially drove the avalanche zone through the diode, i.e., the diode continues to be reverse biased in the usual sense.

The ensuing events will now be developed. (This particular problem is also of significance in "recovery" transients in other types of diode operation such as snap diodes and PIN diodes and thus is of general importance.) At time zero, our assumed application of $I_R$ causes an electric field to develop within the diode. Two cases are of interest. In the first, the hole electron plasma can initially carry the total current $I_R$ at fields less than $E_s$, i.e., $$IR = q\mu(p_o + n_o)E_o \text{ with } E_o < E_s. \qquad (42)$$

In the second $I_R$ exceeds the limitations of equation (42) and $I_R$ is in part particle current and in part displacement current. The lower current regime is the more important and will be developed in some detail. As will be seen, the development of the behavior in the high current regime is simply obtained from this treatment in the limit as $E_o \to E_s$ or equivalently as the velocities of the carriers in the plasma become saturated.

Thus, assume that at time zero equation (42) holds throughout the original depletion layer and now, at a later time $t_o$, we inquire as to the shape of the electric field vs. distance plot at the left-hand edge, of the original depletion region, i.e., plane G, FIG. 7. As in the breakdown transient, after an extremely short formation time this region can be characterized by zones (see FIG. 8). Plane A′ is defined as that plane at which the electric field first rises above $E_o$. Thus, immediately to the right of plane A′ we have the undisturbed plasma densities $n_o$ and $p_o$ where equation (42) applies and where the electric field is $E_o$. On the other hand, neglecting diffusion, no holes are to be found to the left of plane A′ other than the negligible number appearing due to thermal generation. This results from the fact that there is no source of holes at the left-hand edge of the depletion layer, (fields are far below $E_a$) and the original compliment of holes $p_o$ in this region has moved to the right with velocity $\mu E_o$ which we label $v_p$, the plasma velocity. Thus, since we have assumed that electron and hole mobilities are identical equation (5) can be rewritten.

$$I_R = q(n_o + p_o)v_p. \qquad (43)$$

It should thus be apparent that plane A′ moves to the right with velocity $v_p$, and indeed is coincident with the trailing edge of the hole distribution which in turn is moving to the right with velocity $v_p$.

In our deterministic picture where all carriers respond to electric fields with velocity $v = \mu E$ it is easy to see that holes cannot remain to the left of plane A′ since the electric field is higher there by definition and they would "catch up" to plane A′. The inclusion of diffusion would of course place carriers to the left of A′ but it is easy to show that this detail is of negligible importance to the argument.

Plane B′ is defined by $E = E_s$, i.e., that plane at which $E$ has increased from $E_o$ to $E_s$ due to the net space charge (in this case electrons and ionized acceptors) to the right preceding plane A′.

Between plane B′ and plane G, carrier velocities are saturated and due to our assumption of constant current, the slope of the electric field is constant.

As in the study of the transiting avalanche zone, it is helpful to utilize a moving coordinate system and this time it will be fixed at plane A′ and move with the "plasma velosity" $v_p$. It is important to note that to an observer in this frame, the dependence of $E$ on $z$ (distance measured to the left from moving plane A′) between planes A′ and G is determined solely by events to the right of plane A′ and by the driving current $I_o$. Thus, as long as $I_o$ is maintained and the hole and electron densities preceding plane A′ are $n_o$ and $p_o$, $E$ vs. $z$ assumes a predictable shape. Consequently, successive time snapshots of $E$ vs. $z$ would appear as in FIG. 9.

Since plane A′ moves to the right with velocity $v_p$, and since the electrons to the right of plane A′ are moving to the left with velocity $v_p$, an electron current given by $2qn_ov_p$ must cross plane A′. Since this current is constant, a steady state field and charge distribution is established in the moving reference frame between planes A′ and B′ in a time negligibly small in comparison to the transit time of plane A′ through the diode. It then follows from the electron current continuity equation that between planes A′ and B′, $$qn(v_p + \mu E) = 2qn_ov_p. \qquad (44)$$

Also, in the moving reference frame Poisson's equation becomes $dE/dz = q\epsilon(n + N_a.$ (45)

Since $z$ is measured to the left a negative space charge causes an increasing $dE/dz$ to the left. Equations (44) and (45) yield $$\frac{dE}{dz} = \frac{q}{\epsilon}\left(\frac{n_0 2v_D}{v_D + \mu E} + N_a\right) \quad (46)$$

This equation can be readily integrated to give $E(z)$ between planes A' and B'. It must be remarked, however, that equation (46) is markedly affected by our neglection of diffusion. Fortunately, this does not affect the generality of our overall results since the voltage drop from plane A' to plane B' is negligible and consequently the precise shape of $E$ vs. $z$ in this region is unimportant.

At plane B', by definition, equation (44) becomes $qn(v_p + v_s) = 2qn_o v_p$ (47)

so that the density of electrons crossing plane B' is given by $$n = \frac{2n_o v_D}{v_D + v_s} \quad (48)$$

Figure 8:
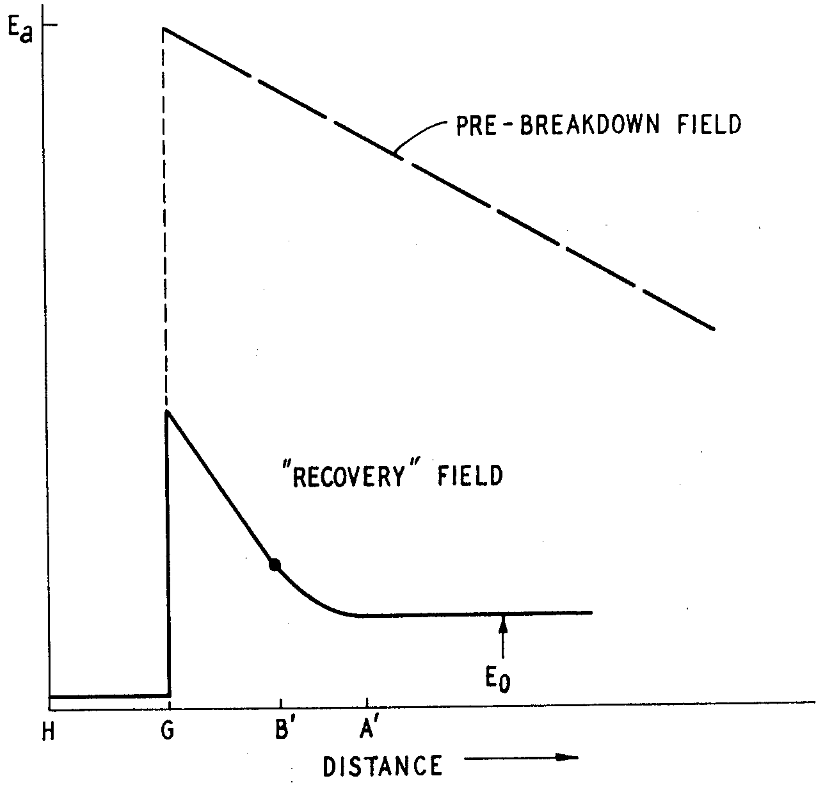
Figure 9:
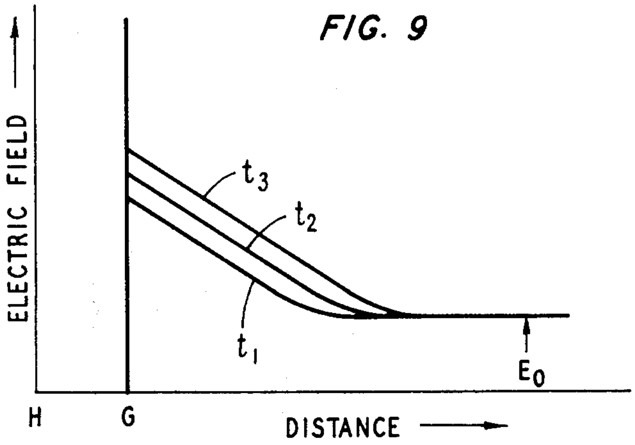

The shape of the electric field vs. distance profile to the left of plane B' is of importance and will now be obtained. Since carrier velocities are saturated in region B'G, the carrier density $n$ entering at plane B' cannot change with distance. Thus, in this region Poisson's equation becomes $$\frac{dE}{dz} = \frac{q}{\epsilon}\left(\frac{2n_o v_D}{v_D + v_s} + N_a\right) \quad (49)$$

or, the slope of the electric field is a constant in this region as was indicated in FIGS. 8 and 9. Integration of equation (49) yields, $$E(z) = E_s + \frac{q}{\epsilon}\left(\frac{2n_o v_D}{v_D + v_s} + N_a\right)z \quad (50)$$

where $z$ is measured from plane B' to the left.

This concludes the development of our required "tools" for the explanation of the recovery transient under our simplifying assumptions.

First, note that a similar treatment can be applied at the right-hand edge of the original depletion region, plane B, FIG. 7, but here the background impurity concentration reduces the net space charge, i.e., the charge on the ionized acceptors is opposite to that of the exiting holes. Thus, the key equations describing the behavior in the vicinity of plane G, i.e., equations (48) and (50) become in the vicinity of plane B, $$p = \frac{2p_o v_D}{v_D + v_s} \quad (51)$$

$$E(z) = E_s + \frac{q}{\epsilon}\left(\frac{2p_o v_D}{v_D + v_s} - N_a\right)z \quad (52)$$

where $z$ in equation (52) is measured to the right from a plane equivalent to plane A' fixed at the trailing edge of the electron population moving away from plane B, again with velocity $v_p$. Thus, in general, the entire electric field vs. distance profile must appear as in FIG. 10.

Figure 10:
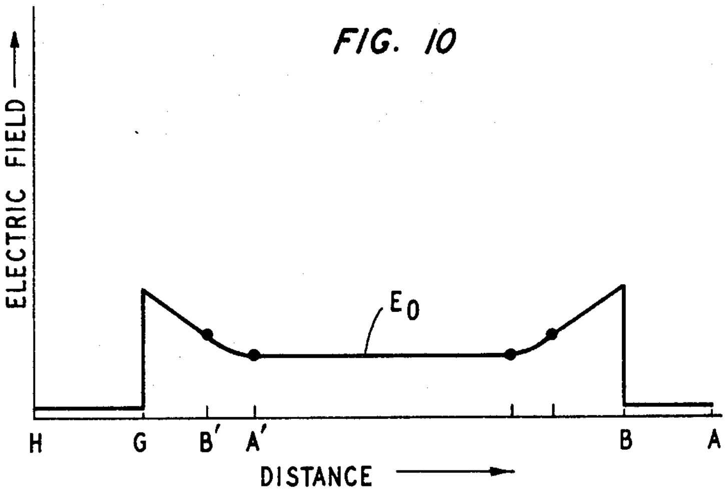

The time evolution of the electric field vs. distance profile of FIG. 10 is straightforward as long as the electric field is always below $E_a$. However $E<E_a$ can be taken as a boundary condition for recovery transients since fields equal to or greater than $E_a$ will produce new carriers which in turn must be swept out.

Figure 11:
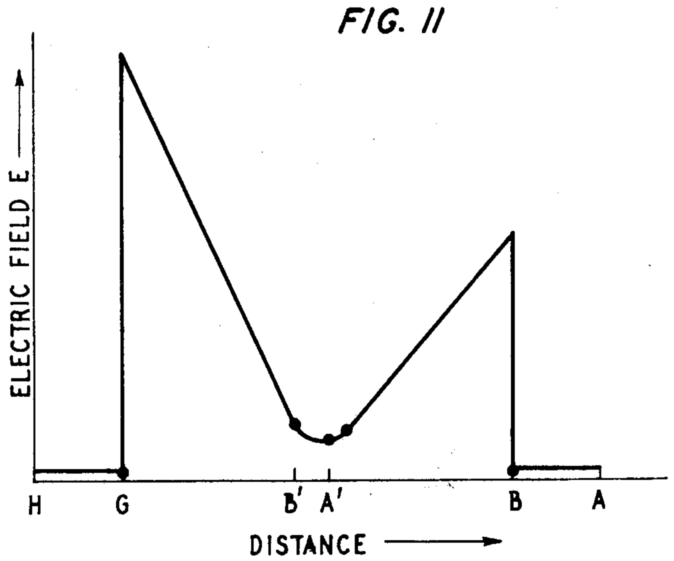

The time evolution leading to the minimum recovery time, subject to this restriction, is of most interest. Consequently, for a given $n_o$ and $p_o$ we seek that value of $I_R$ which will just raise the highest field in the diode (occurring at plane G) to $E_a$ as the last carriers leave. The total resulting elapsed time $\tau$ will be labeled the recovery time and the diode cannot be cleared of charge in times less than $\tau$ under the assumed conditions of constant recovery current $I_R$ and $E<E_a$. $\tau$ can be divided into two parts $\tau = \tau_1 + \tau_2$ where $\tau_1$ is the time for plane A' to meet its counterpart at the center of the diode and is obviously given by $w/2v_p$ where $w$ is the width of the original depletion region, i.e., the separation of planes B and G in FIG. 7. Thus, at time $\tau_1$ into the transient the electric field versus distance plot is as shown in FIG. 11. $\tau_2$ is the time required for the remaining carriers to leave and to a good approximation, since the separation of plane A' and B' is extremely small, $\tau_2 \approx w/2v_s$. Thus, $\tau = w/2v_p + w/2v_s$. (53)

We now proceed to obtain $E(G,t)$. Then our boundary condition can be imposed by setting $E(G,\tau) = E_a \cdot E(G,t)$ is readily obtained since $$j_c(G) = \frac{2qn_o v_D v_s}{v_s + v_D} 0 < t < \tau \quad (54)$$

where $j_c(G)$ is the particle current at $Gt$) Consequently, since the sum of the conduction and displacement current must everywhere equal $I_R$, $\epsilon dE/dt\ (G,t) = I_R - j_c(G)$ (55)

and upon integration, $$E(G,t) = E_o + \frac{1}{\epsilon}\left(I_R - \frac{2qn_o v_D v_s}{v_s + v_D}\right)t \quad (56)$$

Then if $E(G,t) = E_a$ when $t = \tau$, it follows that $I_R = qv_s(2N_o - N_a)$ (57)

when we have neglected $E_o$ in comparison with $E_a$ and where $N_o$ is the punch through impurity concentration, i.e., $$N_o \equiv \frac{\epsilon E_a}{qw}.$$

. It is perhaps surprising that the maximum allowable (constant) current for charge removal is independent of $n_o$ and $p_o$ the starting plasma density, and instead only depends upon the field $E_a$ at which avalanche begins, the width $w$ of the depletion region, and the impurity density $N_a$ in the depletion region. Thus, $I_R$ varies from $qv_sN_a$ for diodes which are just punched through to $2qv_sN_a$ for PIN diodes in which $N_a = 0$.

An additional parameter of some interest is the work required to remove the charges represented by $n_o$ and $p_o$ from the depletion region. Consider first a unit electronic charge at some distance $x$ to the right of plane $G$. The work W done on this unit charge is negligible until plane A' reaches it. At this instant in time the field to the left of $x$ is given by $$E(z) = \frac{q}{\epsilon}\left(N_a + \frac{2n_0 v_D v_s}{v_D + v_s}\right)z \quad (58)$$

where we have approximated the field between planes A' and B' by a linear extension of the field in region B'G. This approximation has a negligible effect on the overall calculation. However, the charge now moves to the left with velocity $v_s$ so that we really require $E(z)$ at a time $z/v_s$ later than the time of arrival of plane A' at $x$. Having equation (58) as the initial field we obtain the field at a given value of $z$ at a later time from an integration of $\epsilon dE/dt(z) = I_R - j_c(z)$ (59)

or upon integration $$\Delta E(z) = \frac{1}{\epsilon}\left(I_R - \frac{2qn_0 v_s v_D}{v_D v s}\right)\frac{z}{v_s} \quad (60)$$

Thus, when in transit the unit electronic charge sees a field actually given by $$E(z) = \frac{q}{\epsilon}\left(N_a + \frac{I_0}{qv_s}\right)z \quad (61)$$

and requires energy $W$ given by $$W = \int_0^x E(z)dz = \frac{q}{\epsilon}\left(\frac{I_R}{2v_s} + N_a\right)\frac{x^2}{x} \quad (62)$$

Similarly, for holes it can be shown that the work per unit charge required for removal is given by $$W=\frac{q}{\epsilon}\left(\frac{I_R}{qv_s}-N_a\right)\frac{x^2}{x} \qquad (63)$$

when $x$ is measured to the left from plane B. Thus for a given $p_o$ and $n_o$, the total work required is obtained by integrating equations (62) and (63) for all charges to obtain $$W_{total}=\frac{q}{\epsilon}\left(\frac{I_R}{2v_s}+N_a\right)\int_0^{w/2}\frac{x^2}{2}n_0dx+\frac{q}{\epsilon}\left(\frac{I_R}{2v_s}-N_a\right)\int_0^{w/2}\frac{x^2}{2}p_0dx \qquad (64)$$

and, upon integration, $$W_{total}=\frac{q^2}{\epsilon}[2N_0(n_0+p_0)-2p_0N_a]\frac{w^3}{48} \qquad (65)$$

For the important case in which $n_o$ and $p_o >> N_a$, and consequently $n_o+p_o\approx 2p_o$ it follows that $$W_{total}\approx\frac{q^2}{\epsilon}[2N_0-N_a][n_0+p_0]\frac{w^3}{48} \qquad (66)$$

or, $$W_{total}\approx\frac{Q_TI_R}{\epsilon v_s}\frac{w^2}{48} \qquad (67)$$

where $Q_T \equiv q(n_o+p_o)\ w$ and represents the total removable charge in the diode.

Equation (66) is not necessary for the understanding of TRAPATT operation but it is important in that it contains the principal loss mechanism other than the usual $R_S$ losses external to the depletion region. Other loss mechanisms can dominate in PIN switches and snap diodes but these losses will always add to that of equation (66) which cannot be avoided.

The voltage across the diode during the recovery transient can readily be obtained from equations (50) and (52) and our knowledge of what occurs during the recovery transient. It follows that $$V(t)=E_0w+\frac{I_Rv_D^2t^2}{\epsilon(v_D+v_s)}\ 0\le t\le\tau_1 \qquad (68)$$

and $$V(t)=\frac{I_R}{\epsilon(v_D+v_s)}\left\{v_D^2t^2+(v_s^2-v_D^2)\left(t-\frac{w}{2v_D}\right)^2\right\}+E_0w \qquad (69)$$

wherein the fields in region A'B', and its counterpart, have been approximated by a linear extension of the high field regions to their left and right respectively. This has a negligible effect on the accuracy of the calculated $V(t)$.

III. TRAPATT OPERATION

The mechanisms of zone transit and recovery transient have been examined in some detail for the cases of constant breakdown current and constant recovery current. No attempt has been made to make plausible the cyclic repetition of these two transients. Such a presentation is beyond the scope of this paper. It has been clearly demonstrated, however, that such cyclic operation can be achieved. The starting mechanism to date has arisen from IMPATT voltage swings generated by lightly loading the diode at IMPATT frequencies where a small signal negative resistance exists. When this R.F. voltage builds up to sufficient amplitude, an avalanche zone can be launched into the depletion region. It is from this operation that the word TRAPATT (*trapped plasma avalanche triggered transit*) originated.

Computer simulations have also indicated that the diode current vs. time is reasonably well approximated by a square wave. Consequently, as a start on a design theory we require that the breakdown and the recovery current be equal, and in addition that they be equal to $I_R$ (i.e., we remove the plasma in the minimum time). Consequently, $$I_o=I_R=qv_s(2N_o-N_a). \qquad (70)$$

It follows then that $$v_z=v_s\left(\frac{2N_0}{N_a}-1\right) \qquad (71)$$

By restricting our purview to punched-through step junctions, our TRAPATT design theory has but two variables, $N_o$, and $N_a$, (i.e., the width of our diode and the actual impurity density contained therein). These two parameters will now be determined for a particular high-efficiency TRAPATT design.

Arbitrarily, we require that the time required for the zone to sweep through the diode be one-tenth the desired TRAPATT frequency. This choice keeps short the transition time between the high-voltage, low-current state and the low-voltage high-current state. This choice is not critical and in particular the zone transit time could be chosen to be a somewhat larger fraction of the TRAPATT period $T$ leading to a slightly different design. The tenth period zone transit time does enforce high efficiency however and its consequences will be developed. Precisely, we require $$w/v_z=T/10 \qquad (72)$$

which in turn, through equation (72) requires that $$N_a=\frac{2N_0^2}{\frac{10\epsilon E_a}{qv_sT}+N_0} \qquad (73)$$

Again, arbitrarily, we require that the recovery transient take one-half of the TRAPATT period $T$, namely, $$T=\frac{1}{f}=W\left(\frac{1}{v_D}+\frac{1}{v_s}\right) \qquad (74)$$

It is perhaps obvious that this design will operate at frequencies both above and below the $f$ of equation (74) However our arbitrary assumptions, equations (72) and (74), enforce high efficiency at frequency $f$. At frequencies much above $f$ the efficiency will obviously decrease. Thus in a sense $f$ describes an upper frequency limit for high-efficiency operation.

TRAPATT operation has thus been divided into three periods; a high-voltage state lasting four-tenths $T$, a breakdown transient lasting one-tenth $T$ and a recovery (high-current) transient lasting one-half $T$. Other choices can obviously be made with different optima in mind, but the consequences of this particular design will now be obtained as a function of frequency.

One other "materials parameter" must first be discussed. This is $I_s$. In general $I_s$ can be written $$I_s=\frac{qn_iw}{\tau} \qquad (75)$$

Where $\tau$ is an effective carrier lifetime in the depletion region, $n_i$ the intrinsic carrier concentration (at the operating temperature) and $w$ the width of the depletion region. To be specific, assume $\tau=1\times10^{-7}$ sec., $n_i=10^{14}$, numbers appropriate for both epitaxial Ge and Si at elevated temperatures. Thus, we have $$I_s\approx1.6\times10^2w \qquad (76)$$

and equation (33) becomes $$J_o=1.6\times10^2w\ \exp\frac{j_o}{qv_s(2N_o-N_a)} \qquad (77)$$

which gives $j_c$ in terms of $N_o$ and $N_a$ since $$N_o=\frac{\epsilon E_a}{qw}$$

Also, it follows from equation (37) that $$j_c\approx2qv^*v_z(p_o+n_o) \qquad (78)$$

but since $I_o=q(n_o+p_o)v_p=qv_s(2N_o-N_a)$ it follows from equation (72) that $$j_o=2qv^*v_sv_s(2N_o-N_a)\left(\frac{qN_oT}{\epsilon E_a}-\frac{1}{v_s}\right) \qquad (79)$$

which again gives $j_c$ as a function of $N_o$ and $N_a$ and materials constants, but in addition as a function of the TRAPATT period $T$. We can eliminate $j_c$ from equations (77) and (79) giving finally a relation for $N_o$ and an $N_a$ for any given period $T$. This equation in conjunction with equation (71) gives $N_o$ and $N_a$ as a function of $T$.

Selecting $E_n$=2×10$^5$ volts/cm., $v_s$=7×10$^6$ cm./sec. and $\epsilon$=1.4 ×10$^{-12}$ farad/cm., numbers roughly appropriate for Ge, one obtains the values shown in FIGS. 10 and 11 for $N_o(f)$ and $N_o(f)n_n(f)$.

Two additional effects are also included in these figures. The first is the variation in the design values as $I_s$ is increased or decreased by two orders of magnitude from our starting assumption. This change is not negligible, and is seen, FIG. 13, to be particularly important at low frequencies. Since $I_s$ is a poorly (if at all) controlled parameter in device fabrication, this may explain some of the difficulties in reproducing results from laboratory to laboratory. The second effect is that incurred by arbitrarily increasing $E_n$ by 50 percent to 3×10$^5$v./cm. which is in the direction expected for higher frequencies due to the actual nonlinearity in ionization rates. It is seen to have little effect on the ratio of $N_o/N_n$, FIG. 13, but an appreciable effect on $N_o$, as would be expected.

The values calculated for $N_o$ and $N_n$ depend upon $$\frac{\epsilon E_a}{v_s}.$$

It is interesting to note that this parameter is approximately the same for both silicon and germanium, i.e., assuming the values below

| | $\epsilon$ | $E_n$ | $v_s$ |
|---|---|---|---|
| Ge | 1.4×10$^{-12}$ farad/cm. | 2×10$^5$ v./cm. | 7×10$^6$ cm./sec. |
| Si | 1.0×10$^{-12}$ farad/cm. | 4×10$^5$ v./cm. | 10×10$^6$ cm./sec. |

The curves in FIGS. 12 and 13 fit silicon as well as germanium. This does imply a difference in the ratio of the TRAPATT period to the transit time at saturated velocity for the two materials. Further work must be done to establish the relevance of this difference.

This completes the zero order TRAPATT design. The closeness of this design to functioning Ge structures is to be noted.

The careful reader will observe that the dichotomy of breakdown transient and recovery transient is not complete in TRAPATT operation and indeed that the recovery transient begins at plane G as soon as the high field region associated with the traveling avalanche zone, i.e., plane F, FIG. 7 has passed. Consequently in the development of FIG. 10 for TRAPATT operation, the field rise at the left-hand edge (plane G) begins a time $t'$ earlier than that at the right-hand edge with $t'$ given by $w/v_z$. It can be shown that this modifies $\tau$ such that $$\tau=\frac{w}{2v_D}+\frac{w}{2v_s}+\frac{w}{2v_z}\left(1+\frac{v_D}{v_s}\right) \quad (80)$$

as compared with equation (53). The correction term will, in general, be small but can be simply included in equation (56) to give $F(G, \tau)$ and consequently a difference in $I_R$, max as expressed by equation (57). The resulting perturbation of the zero order design theory is then straightforward.

What is claimed is:

1. A method for making a semiconductor oscillator for operation in the TRAPATT mode comprising the steps of:

making a diode having first, second and third crystalline semiconductor layers, the first and second layers forming a PN junction and the third layer being of relatively high conductivity, the second layer being of sufficiently small width that, when a sufficient reverse-bias voltage is applied to the junction to cause avalanche breakdown, an electric field extends the entire distance from the PN junction to the third layer;

the foregoing step being accomplished with sufficient care to substantially eliminate recombination centers in the crystalline lattice, thereby assuring a high carrier lifetime within the layer;

controllably introducing a sufficient number of recombination centers to increase the reverse saturation current $I_s$ across the PN junction to an appropriate value for TRAPATT mode diode operation;

and inserting the diode in a TRAPATT oscillator circuit resonant at an IMPATT frequency $f$ and a TRAPATT frequency $f/n$, where $n$ is an integer.

2. The method of claim 1 wherein:

the recombination center introducing step comprises the step of subjecting the diode to high energy particle radiation.

3. The method of claim 2 wherein:

the recombination center introducing step comprises the step of inserting the diode in a TRAPATT oscillator circuit, applying a bias across the diode, and irradiating the diode until it begins to oscillate in the TRAPATT mode.

4. The method of claim 1 wherein:

the recombination center introducing step comprises the step of diffusing gold into the diode.

5. The method of claim 1 wherein:

the recombination center introducing step increases the reverse saturation current $I_s$ to a value sufficient substantially to satisfy the relations:

$$I_s=\frac{qn_iW}{\tau}$$

$$\frac{v_D}{v_s}=\frac{1}{a}(\sqrt{1+a^2}+1)$$

$$a=\frac{2I_0(2N_0/N_a-1)}{j_0(4N_0/N_a-3)}$$

$$\frac{I_s}{I_0}=\frac{j_0}{I_0}\exp\left(\frac{I_s-j_0}{I_0}\right)$$

where $q$ is the charge on the majority carrier, $n_i$ is the intrinsic carrier concentration at the operating temperature. $W$ is the width of the second layer, $\tau$ is the effective lifetime of a majority carrier in the second layer, $v_p$ is the plasma velocity in the second layer, $v_z$ is the avalanche zone velocity in the second layer, $N_o$ is the majority carrier concentration in the second layer, $N_n$ is the impurity concentration in the second layer, and $I_o$ is the current density at the diode terminals.

* * * * *

UNITED STATES PATENT OFFICE

CERTIFICATE OF CORRECTION

Patent No. 3,624,557 Dated November 30, 1971

Inventor(s) Bernard C. De Loach, Jr. and Donald L. Scharfetter

It is certified that error appears in the above-identified patent and that said Letters Patent are hereby corrected as shown below:

Col. 1, line 47, change "know" to --known--.

Col. 4, Equation (2), change "$\left(\sqrt{1 + a^2 -1}\right)$" to read --$\left(\sqrt{1 + a^2}\ -1\right)$--.

Col. 5, line 36, delete the parentheses;
line 58, delete the parentheses;
Equation (5), change "+" to -- $\simeq$ --.

Col. 6, Equation (8), change the equation to read --$I_o = \varepsilon \frac{dE}{dt}$--.
line 37, after the period delete "theory".

Col. 7, line 6, change "EG" to --FG--.
Equation (13), change the equation to read --$q(v_s+v_z)\frac{dn}{dz} = q\alpha(n+p)v_s$--.
Equation (14), change the equation to read --$q(v_z-v_s)\frac{dp}{dz} = q\alpha(n+p)v_s$--.

Col. 8, line 55, change the relation to read --$\left(\frac{\partial E}{\partial z} \simeq 0\right)$--;
Equation (25), change to read --$v_s(n_s+p_s)e^{Dz*} = v_z DN_a z*$--;

FORM PO-1050 (10-69)

USCOMM-DC 60376-P69
* U.S. GOVERNMENT PRINTING OFFICE 1969 O—366-334

UNITED STATES PATENT OFFICE

CERTIFICATE OF CORRECTION

Patent No. 3,624,557 Dated November 30, 1971

Inventor(s) Bernard C. De Loach, Jr. and Donald L. Scharfetter

It is certified that error appears in the above-identified patent and that said Letters Patent are hereby corrected as shown below:

Col. 8, line 60, change "Z*" to --z*--;
Equation (26), change to read $--I_s e^{Dz*} = I_o Dz*--$.

Col. 9, line 57, delete the parentheses around the relation;
Equation (32), change to read
$--j_c = qv_s [p(z*) + n(z*)] = I_s e^{Dz*}--$.

Col. 10, line 43, change "$p = n-N_a = 0$" to $--p-n-N_a = 0--$;
line 65, change "$1_c$" to $--j_c--$.

Col. 12, Equation (42), change "IR" to $--I_R--$.

Col. 13, Equation (45), change to read $-- \frac{dE}{dz} = \frac{q}{\varepsilon} (n+N_a)--$.

Col. 14, line 21, change "Gt)" to --G.--;
Equation (62), change "$\frac{x^2}{x}$" to $-- \frac{x^2}{2} --$.

Col. 15, Equation (63), change "$\frac{x^2}{x}$" to $-- \frac{x^2}{2} --$.

Col. 17, line 56, change "$I_R$,max" to $--I_{R,max}--$.

Col. 18, (Claim 5), Equation 2, change "+1" to -- -1 --.

U.S. GOVERNMENT PRINTING OFFICE

UNITED STATES PATENT OFFICE

CERTIFICATE OF CORRECTION

Patent No. 3,624,557 Dated November 30, 1971

Inventor(s) Bernard C. De Loach, Jr. and Donald L. Scharfetter

It is certified that error appears in the above-identified patent and that said Letters Patent are hereby corrected as shown below:

All These Should be the
Italic v Instead of the $\nu$

Col. 4, lines 16 and 17, change "$\nu$" to --$v$--.

Col. 5, line 23, change "$\nu$" to --$v$--.

Col. 6, line 35, change "$\nu$" to --$v$--;
line 38, change "$\nu$" to --$v$--, both instances;
Equation (12), change to read --$I_o > v_s q N_a$--.

Col. 7, line 32, change "$\nu_z$" to --$v_z$--;
line 34, change "$\nu_s + \nu_z$" to --$v_s + v_z$--;
line 36, change "$(\nu_z - \nu_s)$" to --$(v_z - v_s)$--;
lines 53 and 54, change the relation to read
--$I_{sat} = q n_s v_s + q p_s v_s$--.

Col. 9, line 16, change "$\nu_z >> \nu_s$" to --$v_z >> v_s$--;
line 36, change "$\nu_z$" to --$v_z$--;
line 40, change "$\nu_z$" to --$v_z$--;
line 41, change "$\nu_z$" to --$v_z$--.

Col. 10, line 13, change "$V_z$" to --$v_z$--;

UNITED STATES PATENT OFFICE
CERTIFICATE OF CORRECTION

Patent No. 3,624,557 Dated November 30, 1971

Inventor(s) Bernard C. De Loach, Jr. and Donald L. Scharfetter

It is certified that error appears in the above-identified patent and that said Letters Patent are hereby corrected as shown below:

Col. 10, line 17, change "$\nu_z$" to --$v_z$--;

Equation (36), change to read

--$j_h = (v_z - \mu E)p = q(v_z - v_s)p(z^*)$ $j_e = q(v_z + \mu E)n = -q(v_z + v_s)n(z^*)$--;

lines 67 and 68, change the relation to read

--$\mu E_{min} << v_s << v_z$ --.

Col. 11, line 6, change "$\nu_s$" to --$v_s$--.

Col. 12, line 31, change "$\nu_p$" to --$v_p$--;

Equation (43), change to read --$I_R = q(n_o + p_o)v_p$--;

line 36, change "$\nu_p$" to --$v_p$--;

line 38, change "$\nu_p$" to --$v_p$--;

line 40, change "$\nu = \mu E$" to --$v = \mu E$--;

line 56, change "velosity" $\nu_p$" to --velocity" $v_p$--;

line 65, change "$\nu_p$" to --$v_p$--;

line 67, change "$\nu_p$" to --$v_p$--;

change the relation "$2qn_o\nu_p$" to read

--$2qn_ov_p$--;

UNITED STATES PATENT OFFICE

CERTIFICATE OF CORRECTION

Patent No. 3,624,557 Dated November 30, 1971

Inventor(s) Bernard C. De Loach, Jr. and Donald L. Scharfetter

It is certified that error appears in the above-identified patent and that said Letters Patent are hereby corrected as shown below:

Col. 12, Equation (44), change to read --$qn(v_p+\mu E) = 2qn_o v_p$--;

Equation (47), change to read --$qn(v_p+v_s) = 2qn_o v_p$--.

Col. 14, line 9, change the relation to read --$w/2v_p$--;

line 14, change the relation to read --$\tau_2 \approx \frac{w}{2v_s}$ --;

Equation (53), change to read

--$\tau = \frac{w}{2v_p} + \frac{w}{2v_s}$ --;

Equation (57), change to read --$I_R = qv_s(2N_o-N_a)$;

line 43, change "$qv_sN_a$" to --$qv_sN_a$--;

line 44, change "$2qv_sN_a$" to --$2qv_sN_a$--;

line 58, change " $\frac{z}{v_s}$ " to -- $\frac{z}{v_s}$ --;

Equation (60), change that portion of Equation (60) within braces to

--$I_R - \frac{2qn_o v_s v_p}{v_p+v_s}$ --;

Col. 15, Equation (70), change to read --$I_o = I_R = qv_s(2N_o-N_a)$--.

Col. 16, Equation (72), change to read -- $\frac{w}{v_z} = \frac{T}{10}$ --;

UNITED STATES PATENT OFFICE

CERTIFICATE OF CORRECTION

Patent No. 3,624,557 Dated November 30, 1971

Inventor(s) Bernard C. De Loach, Jr. and Donald L. Scharfetter

It is certified that error appears in the above-identified patent and that said Letters Patent are hereby corrected as shown below:

Col. 16, Equation (78), change to read $--j_c \approx 2qv^* v_z (p_o + n_o)$;

line 66, change the relation to read $--I_o = q(n_o p_o) v_p = q v_s (2N_o - N_a)--$.

Col. 17, line 1, change "$\nu_s = 7\text{x}10^6$ cm/sec" to $--v_s = 7\text{x}10^6$ cm/sec--;

line 4, change the relation to read $--N_o(f)/N_a(f)--$;

lines 28 through 31, on the heading in the table of values, third item, and under column $E_a$, change "$\nu$" to $--v--$;

line 49, change "$\frac{w}{\nu_z}$" to $-- \frac{w}{v_z} --$.

Col. 18, line 55, change "$\nu_p$" to $--v_p--$;

line 56, change "$\nu_z$" to $--v_z--$.

Signed and sealed this 18th day of July 1972.

(SEAL)
Attest:

EDWARD M.FLETCHER,JR.
Attesting Officer

ROBERT GOTTSCHALK
Commissioner of Patents